(12) United States Patent
Groves

(10) Patent No.: US 6,731,593 B1
(45) Date of Patent: May 4, 2004

(54) OPTIC DISK PROTECTIVE ASSEMBLY

(76) Inventor: Lonnie J. Groves, P.O. Box 800754, Dallas, TX (US) 75380

( * ) Notice: Subject to any disclaimer, the term of this patent is extended or adjusted under 35 U.S.C. 154(b) by 151 days.

(21) Appl. No.: 10/086,527

(22) Filed: Mar. 1, 2002

(51) Int. Cl.[7] ............................................. G11B 7/24
(52) U.S. Cl. ................................................... 369/291
(58) Field of Search ................................. 369/291, 290; 206/232, 309

(56) References Cited

U.S. PATENT DOCUMENTS

| | | | | |
|---|---|---|---|---|
| 5,341,924 A | * | 8/1994 | Morrone | 206/232 |
| 5,476,173 A | * | 12/1995 | Opresco | 206/309 |
| 6,269,074 B1 | * | 7/2001 | Funawatari et al. | 369/291 |
| 6,463,026 B1 | * | 10/2002 | Anderson | 369/290 |
| 2002/0064125 A1 | * | 5/2002 | Shimada et al. | 369/291 |
| 2003/0117937 A1 | * | 6/2003 | Matson et al. | 369/291 |

* cited by examiner

Primary Examiner—Tianjie Chen

(57) ABSTRACT

An optic disk protective assembly for providing a replaceable protective covering for disks containing optically retrievable data. The optic disk protective assembly includes a centerpiece adhesively affixable to an optical disk and a cover member removably and replaceably couplable to the centerpiece.

9 Claims, 2 Drawing Sheets

OPTIC DISK PROTECTIVE ASSEMBLY

BACKGROUND OF THE INVENTION

1. Field of the Invention

The present invention relates to optic disk protectors and more particularly pertains to a new optic disk protective assembly for providing a replaceable protective covering for disks containing optically retrievable data.

2. Description of the Prior Art

The use of optic disk protectors is known in the prior art. Known prior art includes U.S. Pat. No. 5,791,467 which discloses a cover held to a disk by a pocket. U.S. Pat. No. 5,855,273 discloses radially resilient clamping studs for holding a protector on an optic disk. U.S. Pat. No. 4,736,840 discloses upper and lower plates having a radius greater than a standard radius to form a protective storage device for optic disks. U.S. Pat. No. 3,987,900 discloses a jacket assembly for magnetic disk memory. U.S. Pat. No. 4,879,710 discloses a cellulose triacetate film with adhesive in a center portion for semi-permanent attachment to an optic disk. U.S. Pat. No. Des. 362,367 shows an ornamental appearance for a cover for an optical disk.

While these devices fulfill their respective, particular objectives and requirements, the need remains for an assembly that provides protection for an optical disk while also providing a more easily replaced protective cover should the protective cover itself become damaged.

SUMMARY OF THE INVENTION

The present invention meets the needs presented above by providing a centerpiece that attaches directly to an optical disk and a protective cover that snaps onto the centerpiece into a protective position over the optic disk. Should the protective cover become damaged, it can be unsnapped from the centerpiece and a new protective cover put into place. In the event the centerpiece becomes damaged, it too may be replaced.

Still yet another object of the present invention is to provide a new optic disk protective assembly that is highly economical in that protective covers can be easily and inexpensively produced.

Even still another object of the present invention is to provide a new optic disk protective assembly that requires centering of the placement of only the centerpiece because the protective cover is centered automatically when centerpiece is centered. Thus easy replacement of the protective cover alone is possible without having to worry about centering the protective cover.

To this end, the present invention generally comprises a centerpiece adhesively affixable to an optical disk and a cover member removably and replaceably couplable to the centerpiece.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
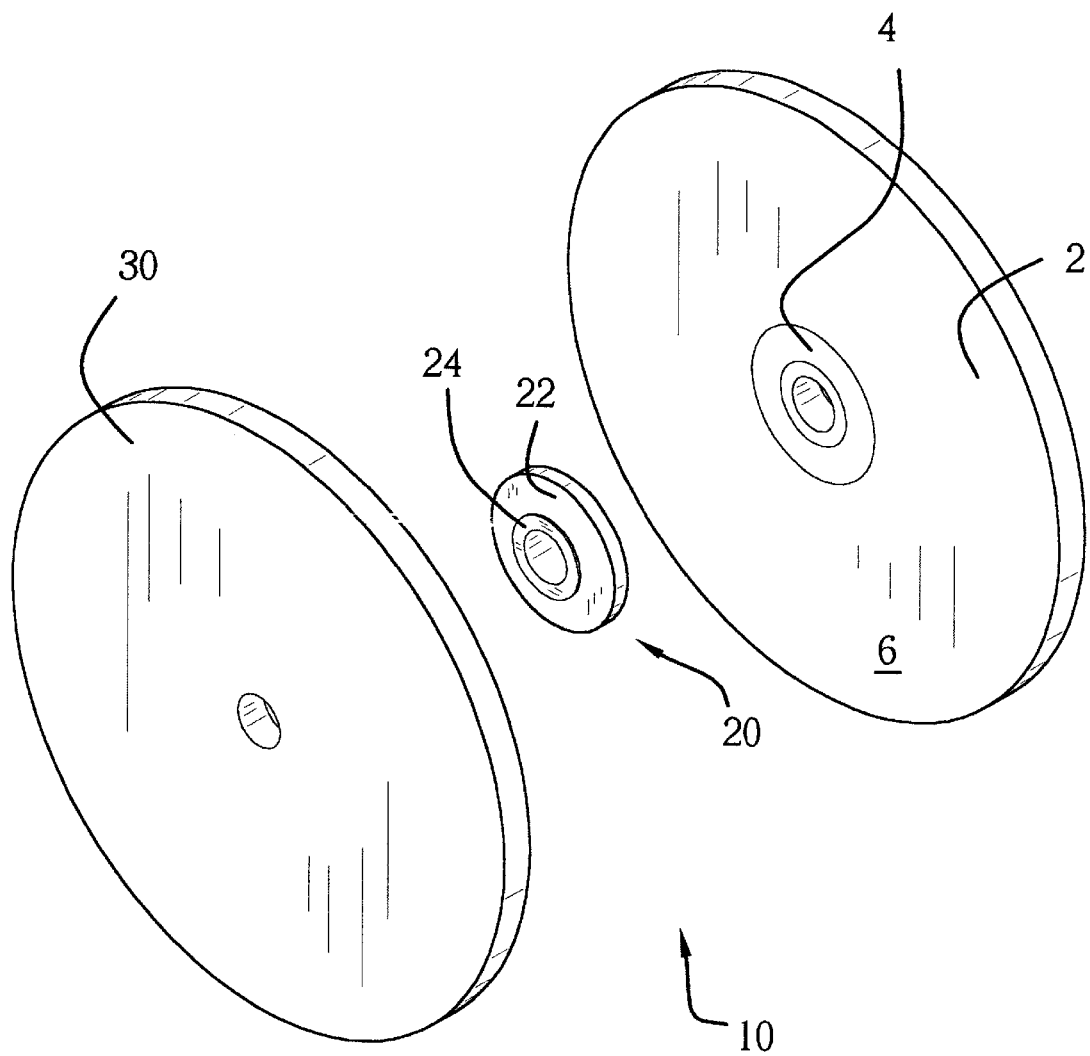
FIG. 1 is an exploded perspective view of a new optic disk protective assembly according to the present invention.
Figure 2:
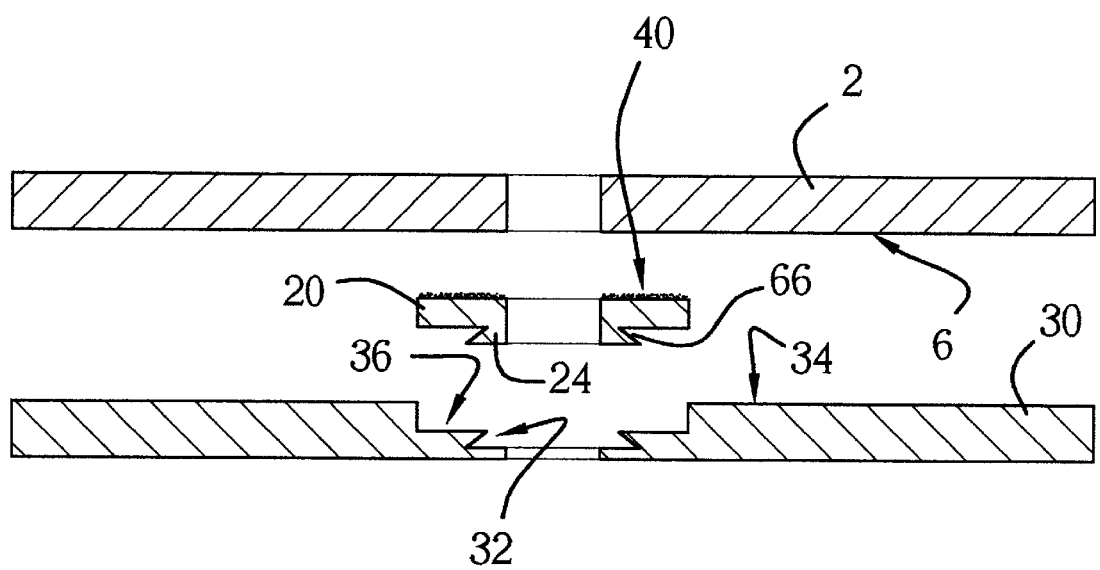
FIG. 2 is an exploded cross-sectional view of the present invention.

With reference now to the drawings, and in particular to FIGS. 1 through 2 thereof, a new optic disk protective assembly embodying the principles and concepts of the present invention and generally designated by the reference numeral 10 will be described.

As best illustrated in FIGS. 1 through 2, the optic disk protective assembly 10 generally comprises a centerpiece 20 having a face 22 designed for coupling to a center portion 4 of an optic disk 2. A lip 24 extends from the centerpiece 20. A transparent cover 30 has a groove 32 for receiving and engaging the lip 24. Thus, the transparent cover 30 is coupled to the centerpiece 20 such that the transparent cover 30 is adapted for covering a face 6 of the optic disk 2 when the centerpiece 20 is coupled to the optic disk 2.

The groove 32 is offset from a face 34 of the transparent cover 30. Thus, the face 34 abuts the face 6 of the optic disk when the transparent cover 30 is coupled to the centerpiece 20 to protect the face 6 of the optic disk 2 from damage.

An adhesive 40 is coupled to the face 22 of the centerpiece 20 for affixing the centerpiece 20 to the optic disk 2. Typically, the adhesive 40 is of such a quality that the centerpiece is held firmly in place during normal use but is weak enough that the centerpiece is still removable from the optic disk 2 without taking extraordinary measures that would likely damage the optic disk. Thus, the centerpiece 20 may be replaced if it is damaged.

The transparent cover 30 includes a recess 36 for receiving the centerpiece 20 when the transparent cover 30 is coupled to the centerpiece 20.

Although other shapes may be employed, the centerpiece 20 is most preferably annular. The recess 36 is shaped for snugly receiving the centerpiece 20 for facilitating alignment of the lip 24 with the groove 32.

The recess 36 is complimentary in shape to the centerpiece 20. Thus, the face 22 of the centerpiece 20 is positioned flush with the first face 34 of the transparent cover 30 when the transparent cover 30 is coupled to the centerpiece 20.

The lip 24 has an angled outer perimeter wall 66 for facilitating engagement of the lip 24 to the groove 32.

In use, the centerpiece is centered and attached to the optic disk. The protective cover then snaps onto the centerpiece into position covering the face of the optic disk to protect it from damage. Typically the protective cover is constructed from a relatively inexpensive transparent material that will not interfere with reading of the optically stored data on the optic disk. Should the protective cover become damaged, it is removable from the centerpiece and replaced by snapping another undamaged protective cover into place.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A protective assembly for protecting an optic disk from being damaged, said protective assembly comprising:
   a centerpiece having a first face adapted for coupling to a center portion of the optic disk;
   a lip extending from said centerpiece;
   a transparent cover having a groove for receiving said lip whereby said transparent cover is coupled to said centerpiece such that said transparent cover is adapted for covering a face of the optic disk; and
   said groove being offset from an upper face of said transparent cover whereby said upper face abuts the face of the optic disk when said transparent cover is coupled to said centerpiece.

2. The protective assembly of claim 1, further comprising:
   an adhesive coupled to the first face of said centerpiece whereby said centerpiece is adapted for being affixed to the optic disk.

3. The protective assembly of claim 1, further comprising:
   said transparent cover including a recess for receiving said centerpiece when said transparent cover is coupled to said centerpiece.

4. The protective assembly of claim 3, further comprising:
   said centerpiece being annular, said recess being shaped for snugly receiving said centerpiece for facilitating alignment of said lip with said groove.

5. The protective assembly of claim 3, further comprising:
   said recess being,complimentary in shape to said centerpiece whereby the first face of said centerpiece is positioned flush with an upper face of said transparent cover when said transparent cover is coupled to said centerpiece.

6. The protective assembly of claim 1, further comprising:
   said lip having an angled outer perimeter wall for facilitating engagement of said lip to said groove.

7. A protective assembly for protecting an optic disk from being damaged, said protective assembly comprising:
   a centerpiece having a first face adapted for coupling to a center portion of the optic disk;
   a lip extending from said centerpiece;
   a transparent cover having a groove for receiving said lip whereby said transparent cover is coupled to said centerpiece such that said transparent cover is adapted for covering a face of the optic disk;
   said groove being offset from an upper face of said transparent cover whereby said first face abuts the face of the optic disk when said transparent cover is coupled to said centerpiece;
   an adhesive coupled to a face of said centerpiece whereby said centerpiece is adapted for being affixed to the optic disk;
   said transparent cover including a recess for receiving said centerpiece when said transparent cover is coupled to said centerpiece;
   said centerpiece being annular, said recess being shaped for snugly receiving said centerpiece for facilitating alignment of said lip with said groove;
   said recess being complimentary in shape to said centerpiece whereby said first face of said centerpiece is positioned flush with said upper face of said transparent cover when said transparent cover is coupled to said centerpiece; and
   said lip having an angled outer perimeter wall for facilitating engagement of said lip to said groove.

8. A protective assembly for protecting an optic disk from being damaged, said protective assembly comprising:
   a centerpiece having a first face adapted for coupling to a center portion of the optic disk;
   a lip extending from said centerpiece;
   a transparent cover having a groove for receiving said lip whereby said transparent cover is coupled to said centerpiece such that said transparent cover is adapted for covering a face of the optic disk; and
   an adhesive coupled to the first face of said centerpiece whereby said centerpiece is adapted for being affixed to the optic disk.

9. The protective assembly of claim 8, further comprising:
   said lip having an angled outer perimeter wall for facilitating engagement of said lip to said groove.

* * * * *